US012614719B2

(12) United States Patent
Baek et al.

(10) Patent No.: US 12,614,719 B2
(45) Date of Patent: Apr. 28, 2026

(54) ELECTRODE FOR LITHIUM SECONDARY BATTERY HAVING SPECIFIC COMPOSITION CONDITION AND LITHIUM SECONDARY BATTERY COMPRISING THE SAME

(71) Applicant: LG ENERGY SOLUTION, LTD., Seoul (KR)

(72) Inventors: Jooyul Baek, Daejeon (KR); Taegyun Noh, Daejeon (KR); Heewon Choi, Daejeon (KR); Mi Ru Jo, Daejeon (KR); Chan Ki Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 830 days.

(21) Appl. No.: 17/612,676

(22) PCT Filed: Jun. 26, 2020

(86) PCT No.: PCT/KR2020/008379
§ 371 (c)(1),
(2) Date: Nov. 19, 2021

(87) PCT Pub. No.: WO2020/263023
PCT Pub. Date: Dec. 30, 2020

(65) Prior Publication Data
US 2022/0223843 A1    Jul. 14, 2022

(30) Foreign Application Priority Data
Jun. 27, 2019    (KR) ........................ 10-2019-0077189

(51) Int. Cl.
| | |
|---|---|
| *H01M 4/36* | (2006.01) |
| *H01M 4/04* | (2006.01) |
| *H01M 4/587* | (2010.01) |
| *H01M 4/62* | (2006.01) |
| *H01M 4/66* | (2006.01) |
| *H01M 10/052* | (2010.01) |
| *H01M 4/02* | (2006.01) |

(52) U.S. Cl.
CPC ......... *H01M 4/366* (2013.01); *H01M 4/0404* (2013.01); *H01M 4/587* (2013.01); *H01M 4/622* (2013.01); *H01M 4/661* (2013.01); *H01M 10/052* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 9,281,513 B2 | 3/2016 | Takahata | |
| 10,014,524 B2 | 7/2018 | Takahata et al. | |
| 10,454,096 B2 | 10/2019 | Kim et al. | |
| 2013/0022867 A1* | 1/2013 | Suzuki | H01M 4/13 429/211 |
| 2014/0272540 A1* | 9/2014 | Takahata | H01M 4/622 429/156 |
| 2015/0380739 A1 | 12/2015 | Watanabe et al. | |
| 2016/0099483 A1 | 4/2016 | Lee et al. | |
| 2018/0205064 A1 | 7/2018 | Lee et al. | |
| 2019/0305308 A1* | 10/2019 | Lee | H01M 4/621 |
| 2020/0176753 A1 | 6/2020 | Lee et al. | |

FOREIGN PATENT DOCUMENTS

| | | |
|---|---|---|
| CN | 108701816 A | 10/2018 |
| JP | 5316862 B2 | 10/2013 |
| JP | 5787196 B2 | 9/2015 |
| JP | 2016-027549 A | 2/2016 |
| JP | 5924550 B2 | 5/2016 |
| KR | 10-2018-0009084 A | 1/2018 |
| KR | 10-2018-0023820 A | 3/2018 |
| KR | 10-2018-0035693 A | 4/2018 |
| KR | 10-2019-0019854 A | 2/2019 |
| KR | 10-2019-0060713 A | 6/2019 |
| KR | 10-2019-0060719 A | 6/2019 |
| WO | 2018/062836 A2 | 4/2018 |
| WO | WO 2018/062836 * | 5/2018 |

OTHER PUBLICATIONS

International Search Report (with partial translation) and Written Opinion dated Oct. 6, 2020, issued in corresponding International Patent Application No. PCT/KR2020/008379.
Extended European Search Report dated Nov. 11, 2021, issued in corresponding European Patent Application No. 20831998.8.
Office action dated Jul. 7, 2023 issued in corresponding Chinese Patent Application No. 202080004562.7.

* cited by examiner

*Primary Examiner* — Alix E Eggerding
(74) *Attorney, Agent, or Firm* — Morgan, Lewis & Bockius LLP

(57) ABSTRACT

The present disclosure relates to an electrode for a lithium secondary battery and a lithium secondary battery including the same, the electrode including: a current collector; and an electrode material layer containing an active material and a binder that is formed on at least one surface of the current collector, wherein, when the electrode material layer is divided in half based on the thickness, the upper layer located away from the current collector and corresponding to the thickness of ½ is referred to as an electrode material layer A, and the lower layer located close to the current collector and corresponding to the thickness of ½ is referred to as an electrode material layer B, each of the electrode material layer A and the electrode material layer B contains one or more active material layers, and satisfies all of the conditions (1) to (3) described in claims.

18 Claims, No Drawings

ELECTRODE FOR LITHIUM SECONDARY BATTERY HAVING SPECIFIC COMPOSITION CONDITION AND LITHIUM SECONDARY BATTERY COMPRISING THE SAME

CROSS-CITATION WITH RELATED APPLICATION(S)

This application claims the benefit of Korean Patent Application No. 10-2019-0077189 filed on Jun. 27, 2019 with the Korean Intellectual Property Office, the disclosure of which is incorporated herein by reference in its entirety.

TECHNICAL FIELD

The present disclosure relates to an electrode for lithium secondary battery having specific composition conditions, and a lithium secondary battery including the same.

BACKGROUND ART

As technology development and demand for mobile devices increase, demand for secondary batteries as energy sources has been rapidly increasing. Among these secondary batteries, a lithium secondary battery having high energy density and a high operating voltage, a long cycle lifespan, and a low self-discharge rate is commercially available and widely used.

Also, in recent years, as interest in environmental issues has increased, many studies have been performed on electric vehicles (EVs), hybrid electric vehicles (HEVs) and the like capable of replacing vehicles that use fossil fuels such as gasoline vehicles and diesel vehicles, which are one of the main causes of air pollution. As power sources for electric vehicles (EV) and hybrid electric vehicles (HEV), lithium secondary batteries having high energy density, high discharge voltage and output stability are mainly studied and used.

These lithium secondary batteries are being developed as models that can realize high voltage and high capacity at the requests of consumers. In order to realize a high capacity, an optimization process of a positive electrode material, a negative electrode material, a separator, and an electrolyte, which are four elements of a lithium secondary battery, is required within a limited space.

On the other hand, with the recent development of such secondary batteries, for various reasons, an electrode having a multi-layered structure in which the electrode material layer is not a single layer but two or more layers has been developed.

For example, in order to solve a problem in which a binder or a conductive material floats in the drying process, or to improve high rate charge/discharge characteristics or life characteristics, or to exhibit the most desirable secondary battery performance when different active materials are used, an electrode of multi-layered structure is used.

Of these, in general, in order to manufacture a battery having excellent battery performance and stability while realizing high capacity, research is being actively conducted in the industry on a method for improving the adhesive force of the electrode while preventing deterioration in output characteristics has been actively conducted in the art. Currently, a method of uniformly distributing a binder for improving the adhesive force of the electrode and a conductive material for improving conductivity in the electrode has been widely studied.

However, if the content of the binder is increased in order to improve the adhesive force of the electrode, there is a problem that the internal resistance of the electrode increases, the electronic conductivity decreases, and the capacity decreases. If the content of the conductive agent is increased in order to improve the output characteristics, there is a problem in that the adhesive force is lowered and the amount of active material is reduced, and the capacity is reduced.

Moreover, in the process of coating the electrode and then drying it, there was a problem that the binder and the conductive material moves in the direction in which the solvent volatilizes in a slurry state, and thus weakens the adhesive force between the current collector and the electrode mixture. Thus, a technology for manufacturing an electrode by a multi-layered structure has been applied. At this time, a technique is known in which a large amount of a binder is put in a lower layer close to the current collector, and a little binder is put in an upper layer far from the current collector to improve the adhesive force between the current collector and the active material.

In addition, when designing an electrode with improved rapid charging, especially the negative electrode, the lower layer close to the current collector, has mainly used natural graphite owing to the adhesive force, and the upper layer far from the current collector has mainly used artificial graphite to improve output characteristics.

However, even with such a structure, the problem of a reduction in adhesive force occurred, and there was a limit in showing sufficient high temperature performance, normal temperature performance, and rapid charging performance.

Therefore, in order to solve the above-mentioned problems, there is a high need to develop a more improved secondary battery by limiting specific conditions for the content and composition of an active material and a binder.

DETAILED DESCRIPTION OF THE INVENTION

Technical Problem

The present disclosure has been designed to solve the above-mentioned problems and other technical problems that have yet to be resolved.

An object of the present disclosure is to provide an electrode for a lithium secondary battery which can improve adhesiveness, high temperature performance, normal temperature performance, and rapid charging performance by designing an active material and a binder so as to satisfy specific conditions.

Technical Solution

According to an embodiment of the present disclosure, there is provided an electrode for a lithium secondary battery comprising:

a current collector; and an electrode material layer containing an active material and a binder that is formed on at least one surface of the current collector, wherein, when the electrode material layer is divided in half based on the thickness, the upper layer located away from the current collector and corresponding to the thickness of ½ is referred to as an electrode material layer A, and the lower layer located close to the current collector and corresponding to the thickness of ½ is referred to as an electrode material layer B, each of the electrode material layer A and the electrode material layer B contains one or more active material layers, and satisfies all of the following conditions (1) to (3):

(1) the electrode material layer A contains artificial graphite as an active material in an amount of 75% by weight or more based on the total weight of the active material contained in the electrode material layer A, and the electrode material layer B contains a expansion-suppressing natural graphite as an active material in an amount of 80% by weight or more based on the total weight of the active material contained in the electrode material layer B, (2) the active material contained in the electrode material layer A has a specific surface area (BET) of 0.6 to 1.4 $m^2/g$, and the active material contained in the electrode material layer B has a specific surface area (BET) of 1.4 to 3.6 $m^2/g$, and (3) when the weight % occupied by the binder contained in the electrode material layer A based on the total weight of the electrode material layer is referred to as a, and the weight % occupied by the binder contained in the electrode material layer B based on the total weight of the electrode material layer is referred to as b, a>b, 3≤a+b≤5, 2≤a≤3, and 1≤b≤2.

In this case, the electrode material layer A and the electrode material layer B may have a multi-layered structure that forms a boundary with each other.

Further, each of the electrode material layer A and the electrode material layer B may include two or more active material layers, and may have a multi-layered structure that forms a boundary with each other.

In a specific embodiment of the present disclosure, the present disclosure may further satisfy the following condition (4).

(4) when the concentration of the binder contained in the entire electrode material layer is 1, if the electrode material layer A is divided in half based on the thickness, and the concentration of the binder contained in the area A' located close to the surface of the electrode is referred to as a', and the concentration of the binder contained in the region A" located inside the electrode is referred to as a", and when the electrode material layer B is divided in half based on the thickness, and the concentration of the binder contained in the region B' located close to the electrode material layer A is referred to as b', and the concentration of the binder contained in the area B" located near the current collector is referred to as b", the value of a'/(a"+b'+b") is ⅓ to 1.5.

In one specific embodiment, the electrode material layer A may include artificial graphite as an active material in an amount of 80% by weight or more based on the total weight of the active material contained in the electrode material layer A.

In one specific embodiment, the expansion-suppressing natural graphite contained in the electrode material layer B may be a special natural graphite completed by blocking internal pores using a pitch binder or by making the size of the active material particle uniform.

Accordingly, the expansion-suppressing natural graphite is a special natural graphite having a specific surface area (BET) of 1.4 to 3.6 $m^2/g$, and has a form in which the specific surface area is significantly reduced compared to general natural graphite.

The expansion-suppressing natural graphite may have an average particle size (D50) of 5 to 30 μm.

In one specific embodiment, the binder contained in the electrode material layer A and the electrode material layer B may be SBR (styrene-butadiene rubber).

In one specific embodiment, each of the electrode material layer A and the electrode material layer B may further include CMC (carboxymethylcellulose), wherein the CMC may be contained in an amount of 0.1 to 5% by weight based on the total weight of each electrode material layer.

In addition, the electrode material layer A and the electrode material layer B may each further include a conductive material, wherein the conductive material may be contained in an amount of 0.1 to 5% by weight based on the total weight of each electrode material layer.

On the other hand, the current collector may be made of Cu, and the electrode for the lithium secondary battery may be a negative electrode.

According to another embodiment of the present disclosure, there is provided a lithium secondary battery including the electrode for lithium secondary battery.

Advantageous Effects

As described above, the electrode for a lithium secondary battery according to the present disclosure has improved adhesive force by satisfying specific composition conditions in the active material and the binder, and has the effect of improving the high temperature performance, normal temperature performance, and rapid charging performance of the lithium secondary battery including the same.

DETAILED DESCRIPTION OF THE EMBODIMENTS

According to an embodiment of the present disclosure, there is provided an electrode for a lithium secondary battery comprising:

a current collector; and an electrode material layer containing an active material and a binder that is formed on at least one surface of the current collector, wherein, when the electrode material layer is divided in half based on the thickness, the upper layer located away from the current collector and corresponding to the thickness of ½ is referred to as an electrode material layer A, and the lower layer located close to the current collector and corresponding to the thickness of ½ is referred to as an electrode material layer B, each of the electrode material layer A and the electrode material layer B contains one or more active material layers, and satisfies all of the following conditions (1) to (3):

(1) the electrode material layer A contains an artificial graphite as an active material in an amount of 75% by weight or more based on the total weight of the active material contained in the electrode material layer A, and the electrode material layer B contains a expansion-suppressing natural graphite as an active material in an amount of 80% by weight or more based on the total weight of the active material contained in the electrode material layer B, (2) the active material contained in the electrode material layer A has a specific surface area (BET) of 0.6 to 1.4 $m^2/g$, and the active material contained in the electrode material layer B has a specific surface area (BET) of 1.4 to 3.6 $m^2/g$, and (3) when the weight % occupied by the binder contained in the electrode material layer A based on the total weight of the electrode material layer is referred to as a, and the weight % occupied by the binder contained in the electrode material layer B based on the total weight of the electrode material layer is referred to as b, a>b, 3≤a+b≤5, 2≤a≤3, and 1≤b≤2.

In this case, the electrode material layer A and the electrode material layer B may have a multi-layered structure that forms a boundary with each other.

Therefore, the electrode material layer can be formed so as to satisfy the above conditions, and from this, the effect intended by the present disclosure can be achieved.

It goes without saying that the electrode material layer A and the electrode material layer B may each include two or more active material layers, and may have a multi-layered structure that forms a boundary with each other. Specifically, in consideration of the ease of the process, the electrode material layer A and the electrode material layer B may each include 1 to 3 active material layers, and thus a total of 2 to 6 active material layers may be contained.

Here, the active material layer means a single layer containing an active material or the like based on the application process, and the electrode material layer is a concept including a large number of active material layers composed of a single layer, and the electrode material layer A and the electrode material layer B distinguish the active material layers formed on one or both sides of the current collector based on the thickness.

In the following, the conditions according to the present disclosure are specifically reviewed one by one.

First, in relation to the condition (1), similarly to the conventional case, the present disclosure is configured so that an artificial graphite mainly exists in the electrode material layer A far from the current collector in consideration of output characteristics and life characteristics, and the expansion-suppressing natural graphite that not only has excellent adhesive force, but also significantly reduces the specific surface area is mainly present in the electrode material layer B close to the current collector.

However, in this case, the artificial graphite contained in the electrode material layer A should be 75% by weight or more based on the total weight of the active material contained in the electrode material layer A, particularly 80% by weight or more, more particularly 90% to 100% by weight.

When the content of artificial graphite is less than 75% by weight, high temperature performance, normal temperature performance, and rapid charging performance, which are the effects intended by the present disclosure, cannot reach a satisfactory level.

Further, the expansion-suppressing natural graphite contained in the electrode material layer B should be 80% by weight or more, particularly 90% to 100% by weight, based on the total weight of the active material contained in the electrode material layer B.

When the content of the expansion-suppressing natural graphite is less than 80% by weight, in the case where the content of the binder in the electrode material layer B close to the current collector is less than the content of the binder contained in the electrode material layer A according to the condition (3) of the present disclosure, the adhesive force between the current collector and the electrode material layer cannot be secured above the desired level.

Therefore, unlike the prior art, which increases the content of the binder in the electrode material layer close to the current collector, in the present disclosure, in spite of the condition (3), in order to secure a sufficient adhesive force between the current collector and the electrode material layer, the content of the expansion-suppressing natural graphite of the electrode material layer B should be higher and should be at least 80% by weight.

On the other hand, at this time, the expansion-suppressing natural graphite contained in the electrode material layer B is natural graphite having a specific surface area of 1.4 to 3.6 $m^2/g$. For example, it may be manufactured by blocking internal pores by using a pitch binder or making the particle size of the active material uniform, but is not limited as long as it is manufactured to have a specific surface area within the above range.

In addition, the expansion-suppressing natural graphite may have an average particle size (D50) of 5 to 30 μm.

The average particle size (D50) is the particle size at the 50% point of the cumulative distribution of the number of particles according to the particle size, and can be measured using a laser diffraction method. Specifically, after the powder to be measured is dispersed in a dispersion medium, it is introduced into a commercially available laser diffraction particle size analyzer (e.g., Microtrac S3500). When the particles pass through the laser beam, the difference in the diffraction pattern according to the size of the particles is measured to calculate the particle size distribution. D50 can be measured by calculating the particle size at a point that is 50% of the cumulative distribution of the number of particles according to the particle size in the measuring device. Here, the particle size means the diameter.

Second, in relation to the condition (2), the specific surface area (BET) of the active material contained in the electrode material layer A may be 0.6 to 1.4 $m^2/g$.

The electrode material layer A is mainly for the purpose of improving the output characteristics. Thus, when the specific surface area of the active material contained in the electrode material layer A is too small beyond the above range, there is a problem that the particle size is large and the output characteristics and quick charge characteristics are deteriorated. When the specific surface area of the active material contained in the electrode material layer A is too large, there are problems that high temperature performance, high temperature life and cell safety are deteriorated, which is thus not preferable.

Further, the specific surface area (BET) of the active material contained in the electrode material layer B may be 1.4 to 3.6 $m^2/g$.

As described above, the adhesive force of the electrode material layer B with the current collector is important. However, when the specific surface area is too small outside the above range, it means that the active material size is large. In this case, it is difficult to realize the desired capacity, and the rolling density is lowered. On the other hand, when the specific surface area is too large outside the above range, the reactivity with the electrolyte increases, which causes a problem that high temperature performance, high temperature life, and cell safety are deteriorated, which is thus not preferable.

Here, the "specific surface area (BET)" is measured by the BET method, and specifically, it can be calculated from the absorption amount of nitrogen gas under liquid nitrogen temperature (77 K) using BELSORP-mino II (BEL Japan).

Moreover, the specific surface area (BET) of the active material contained in the electrode material layer can be, when active materials are mixed, calculated by multiplying the specific surface area of each active material by each content % and adding them.

Thirdly, in relation to the condition (3), in the case of manufacturing an electrode having a multi-layered structure according to the prior art, because the adhesive force between the current collector and the active material is significantly lower than that between the active materials, it is not possible to continuously increase the content of the binder. To solve the above problem within a limited amount, the content of the binder in the active material layer on the side near the current collector was configured to be higher than the content of the binder in the active material layer on the side far from the current collector.

However, as confirmed by the present inventors, it was found that when configured as in the prior art, the adhesive force is lowered due to insufficient binder content in the electrode material layer A, so performance is degraded.

As a result of repeated in-depth studies, the present inventors have found that adhesive force between the current collector and the active material is ensured from the composition and specific surface area of the active material, and the content of the binder is adjusted so as to satisfy the above condition (3) according to the present disclosure, thereby improving all of high temperature performance, normal temperature performance and rapid charging performance.

In particular, the adjustment of the content of the binder is very important for achieving the effect intended by the present disclosure together with the above conditions (1) and (2).

Specifically, it was confirmed that satisfactory effects according to the present disclosure can be obtained if all of the conditions as described above, that is, $a>b$, $3 \leq a+b \leq 5$, $2 \leq a \leq 3$, and $1 \leq b \leq 2$, are satisfied, when the weight % occupied by the binder contained in the electrode material layer A based on the total weight of the electrode material layer is referred to as a, and the weight % occupied by the binder contained in the electrode material layer B based on the total weight of the electrode material layer is referred to as b.

It was confirmed that unlike the above conditions, if $a<b$, the rapid charging performance is deteriorated, if $3>a+b$, $2>a$, or $1>b$, the total content of the binder is too small, so the adhesive force of each electrode material layer decreases, resulting in the problem of deterioration of life characteristics, if $5<a+b$, $3<a$, or $2<b$, there is a problem that the contents of the active material and the conductive material are relatively lowered, and so the basic battery capacity at high temperature and normal temperature is lowered.

Therefore, if all of the above conditions (1) to (3) are satisfied, it is possible to obtain an effect in which all the characteristics according to the present disclosure are improved, and if either of them is not satisfied, the performance is degraded in any aspect.

In addition, the present disclosure is configured of a multi-layered structure, and the content of the binder is arbitrarily adjusted, which is clearly distinguished from the prior art that the binder and the conductive material float on the surface of the electrode together when the solvent is volatilized, and the content of the binder increases in the electrode material layer on the side far from the current collector.

Therefore, according to another embodiment of the present disclosure, when the following condition (4) is further satisfied in addition to the above conditions (1) to (3), a further improved effect may be obtained.

(4) when the concentration of the binder contained in the entire electrode material layer is 1, if the electrode material layer A is divided in half based on the thickness, and the concentration of the binder contained in the area A' located close to the surface of the electrode is referred to as a', and the concentration of the binder contained in the region A" located inside the electrode is referred to as a", and when the electrode material layer B is divided in half based on the thickness, and the concentration of the binder contained in the region B' located close to the electrode material layer A is referred to as b', and the concentration of the binder contained in the area B" located near the current collector is referred to as b", the value of $a'/(a"+b'+b")$ is ⅓ to 1.5.

When the above condition (4) is specifically examined, the condition (4) means that a bias effect of the binder does not appear in the region A' located at the most surface side.

That is, by configuring the electrode material layer in a multi-layered structure, the binder is induced to be evenly distributed throughout in each electrode material layer, whereas even if the binder contained in the electrode material layer A moves at a predetermined level toward the surface due to volatilization of the solvent in the electrode material layer A, it should be configured such that the concentration of the binder positioned on the surface is not more than 1.5 times the concentration of other binder positioned other than that.

When the concentration of the surface binder deviates from the above conditions and becomes more than twice the concentration of the binder at other parts, it was confirmed that a phenomenon appears in which the adhesive force is weakened at a predetermined level than when it is not so. Thus, in order to have the most efficient electrode composition, it is more preferable that the condition (4) is also satisfied.

On the other hand, the binder contained in the electrode material layer A and the electrode material layer B may be the type of binder previously disclosed, and for example, it can be selected from the group consisting of polyvinylidene fluoride (PVdF), polyvinyl alcohol, carboxymethylcellulose (CMC), starch, hydroxypropyl cellulose, regenerated cellulose, polyvinylpyrrolidone, polytetrafluoroethylene, polyethylene, polypropylene, an ethylene-propylene-diene terpolymer (EPDM), a sulfonated EPDM, a styrene-butadiene rubber (SBR), and a fluorine rubber. In detail, styrene-butadiene rubber (SBR), which can be used as an aqueous binder while having sufficient adhesive force by using it with a negative electrode active material of a graphite-based material may be used.

The types of binders used for the electrode material layer A and the electrode material layer B may be different, but may be the same in terms of ease of manufacture and securing adhesive force.

The active material contained in each of the electrode material layers may include, in addition to the expansion-suppressing natural graphite or artificial graphite, expansion-suppressing natural graphite in the electrode material layer A, and artificial graphite in the electrode material layer B. Alternatively, each electrode material layer may contain one or more carbon-based materials selected from the group consisting of graphite, amorphous hard carbon, low-crystalline soft carbon, carbon black, acetylene black, ketjen black, Super-P, graphene, and fibrous carbon, Si-based materials, metal composite oxides such as $Li_xFe_2O_3$ $(0 \leq x \leq 1)$, $Li_xWO_2$ $(0 \leq x \leq 1)$, $Sn_xMe_{1-x}Me'_yO_z$ (Me:Mn, Fe, Pb, Ge; Me':Al, B, P, Si, Group 1, 2, 3 elements in the periodic table, halogen; $0<x \leq 1$; $1 \leq y \leq 3$; $1 \leq z \leq 8$); lithium metals; lithium alloys; silicon-based alloys; tin-based alloys; metal-based oxides such as SiO, $SiO_2$, SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; Li—Co—Ni based materials; titanium oxide; lithium titanium oxide, and the like.

Even in this case, the specific surface area of the entire active material satisfies the above condition (2).

Further, the electrode material layer A and the electrode material layer B may each further include CMC (carboxymethylcellulose) and/or a conductive material, wherein the CMC may be contained in an amount of 0.1 to 5% by weight based on the total weight of each electrode material layer, and the conductive material may be contained in an amount of 0.1 to 5% by weight based on the total weight of each electrode material layer.

The conductive material is not particularly limited as long as it has conductivity without causing a chemical change in a corresponding battery, and for example, carbon blacks such as carbon black, acetylene black, ketjen black, channel black, furnace black, lamp black, and thermal black; conductive fibers such as carbon fiber and metal fiber; metal powders such as carbon fluoride powder, aluminum powder, and nickel powder; conductive whiskey such as zinc oxide and potassium titanate; conductive metal oxides such as titanium oxide; conductive materials such as polyphenylene derivatives may be used.

Furthermore, each electrode material layer may optionally further contain a filler as a component to suppress the expansion of the electrode.

The filler is not particularly limited as long as it is a fibrous material that does not cause chemical changes in the secondary battery. Examples of the filler include olefin-based polymers such as polyethylene and polypropylene; and fibrous materials such as glass fiber and carbon fiber.

Meanwhile, the current collector is generally fabricated to a thickness of 3 to 500 μm. The current collector is not particularly limited so long as it does not cause chemical changes in the fabricated battery and has conductivity. For example, the current collector may be made of copper, stainless steel, aluminum, nickel, titanium, sintered carbon, copper or aluminum or stainless steel surface-treated carbon, nickel, titanium, silver, or the like, or aluminum-cadmium alloys. Further, the current collector may also form fine irregularities on a surface thereof to increase adhesion between the electrode active material and the current collector. In addition, it may be used in any of various forms including films, sheets, foils, nets, porous structures, foams, and non-woven fabrics. In detail, it may be made of Cu.

According to another embodiment of the present disclosure, there is provided a lithium secondary battery including the electrode for lithium secondary battery.

The electrode for lithium secondary battery may be a negative electrode.

Therefore, the lithium secondary battery according to the present disclosure can be manufactured by interposing a separator between the electrode for the lithium secondary battery and the positive electrode to prepare an electrode assembly, housing the electrode assembly in a battery case, and then injecting a non-aqueous electrolyte containing a lithium salt, and thus, it may have a structure in which the electrode assembly is impregnated with a non-aqueous electrolyte containing a lithium salt.

The positive electrode is manufactured by forming a positive electrode mixture including a positive electrode active material, a binder, and a conductive material on at least one surface of a positive electrode current collector.

The positive electrode current collector is generally fabricated to a thickness of 3 to 500 μm. The positive electrode current collector is not particularly limited so long as it does not cause chemical changes in the fabricated battery and has conductivity. For example, the current collector may be made of stainless steel, aluminum, nickel, titanium, sintered carbon, aluminum or stainless steel surface-treated carbon, nickel, titanium, silver, or the like. The current collector may also form fine irregularities on a surface thereof to increase adhesion between the positive electrode active material and the current collector. In addition, it may be used in any of various forms including films, sheets, foils, nets, porous structures, foams, and non-woven fabrics.

The positive electrode active material may be, for example, a layered compound such as lithium cobalt oxide ($LiCoO_2$) or lithium nickel oxide ($LiNiO_2$) or a compound substituted with one or more transition metals; lithium manganese oxides such as chemical formula $Li_{1-x}Mn_{2-x}O_4$ (where, x is 0 to 0.33), $LiMnO_3$, $LiMn_2O_3$, $LiMnO_2$; lithium copper oxide ($Li_2CuO_2$); vanadium oxides such as $LiV_3O_8$, $LiFe_3O_4$, $V_2O_5$, and $Cu_2V_2O_7$; a Ni-site type lithium nickel oxide represented by chemical formula $LiNi_{1-x}M_xO_2$ (where, M=Co, Mn, Al, Cu, Fe, Mg, B or Ga, and x=0.01 to 0.3); lithium manganese composite oxide represented by chemical formula $LiMn_{2-x}M_xO_2$ (where, M=Co, Ni, Fe, Cr, Zn or Ta, and x=0.01 to 0.1) or $Li_2Mn_3MO_8$ (where, M=Fe, Co, Ni, Cu or Zn); lithium-manganese composite oxide with spinel structure represented by chemical formula $LiNi_xMn_{2-x}O_4$; $LiMn_2O_4$ with a part of Li of chemical formula substituted with an alkaline earth metal ion; a disulfide compound; $Fe_2(MoO_4)_3$, and the like, but is not limited thereto.

The binder and the conductive material may be used in the same type as described above, and the content of the conductive material may be added within the range of 0.1 to 5% by weight based on the total weight of the positive electrode mixture.

In addition, a filler may be further added, and the description of the filler is as described above.

As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin-based polymer such as polypropylene; glass fiber or polyethylene, which have chemical resistance and hydrophobicity, are used. When a solid electrolyte such as a polymer is employed as the electrolyte, the solid electrolyte may also serve as both the separator and electrolyte.

The lithium salt-containing non-aqueous electrolyte is composed of a non-aqueous electrolyte and a lithium salt. As the non-aqueous electrolyte, a non-aqueous organic solvent, an organic solid electrolyte, an inorganic solid electrolyte, and the like are used, but are not limited thereto.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxyfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte. The lithium salt may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, for the purpose of improving charge and discharge characteristics, flame retardancy and the like, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the lithium salt-containing non-aqueous electrolyte. In some cases, in order to impart incombustibility, the electrolyte may further include halogen-containing solvents, such as carbon tetrachloride and ethylene trifluoride. Furthermore, in order to improve high-temperature storage characteristics, the electrolyte may further include carbon dioxide gas. In addition, it may further include fluoroethylene carbonate (FEC), propene sultone (PRS), and the like.

In one specific example, lithium salts such as $LiPF_6$, $LiClO_4$, $LiBF_4$ and $LiN(SO_2CF_3)_2$ are added to a mixed solvent of a cyclic carbonate of EC or PC as a solvent having a high permittivity and a linear carbonate of DEC, DMC or EMC as a low-viscosity solvent to prepare a lithium salt-containing non-aqueous electrolyte.

Hereinafter, the present disclosure will be described in more detail with reference to examples, but these examples are provided for illustrative purposes only, and should not be construed as limiting the scope and spirit of the present disclosure. \

12

Production Example 1

Production of Special Natural Graphite with Suppressed Expansion

Scale-like natural graphite having a large number of pores therein was spheroidized using a pitch binder. binder. Specifically, the internal pores of the scale-like natural graphite were controlled, and the pitch binder was placed on the surface to proceed to spheroidization. The resulting special natural graphite had an average particle size (D50) of 15 μm and a specific surface area (BET) of 2.2 $m^2/g$.

The average particle size (D50) is the particle size at the 50% point of the cumulative distribution of the number of particles according to the particle size, and can be measured using a laser diffraction method. Specifically, after the powder to be measured is dispersed in a dispersion medium, it was introduced into a commercially available laser diffraction particle size analyzer (e.g., Microtrac S3500). When the particles pass through the laser beam, the difference in the diffraction pattern according to the size of the particles is measured to calculate the particle size distribution. D50 can be measured by calculating the particle size at a point that is 50% of the cumulative distribution of the number of particles according to the particle size in the measuring device.

Production Examples 2 to 23

Production of Slurries A to V

The composition shown in Table 1 was added to distilled water and mixed to produce slurries A to V.

As used herein, The specific surface area of artificial graphite was 1.0 $m^2/g$, the specific surface area of expansion-suppressed natural graphite was 2.2 $m^2/g$, and the specific surface area of natural graphite is 15 $m^2/g$.

* Measurement of specific surface area: Each mixed active material powder was put into BELSORP-mino II (BEL Japan), and the absorption amount of nitrogen under liquid nitrogen temperature (77 K) was measured.

TABLE 1

| | | Active material | | | Active | | Conductive material | |
| --- | --- | --- | --- | --- | --- | --- | --- | --- |
| | Wt. % | Artificial | Expansion suppressing natural | Natural | material BET ($m^2$/g) | Binder (wt. %) SBR | (wt. %) Carbon black | Other (wt. %) CMC |
| Slurry A | 93.6 | 80 | 20 | | 1.24 | 2.4 | 3.0 | 1.0 |
| Slurry B | 93.8 | 80 | 20 | | 1.24 | 2.2 | 3.0 | 1.0 |
| Slurry C | 93.3 | 80 | 20 | | 1.24 | 2.7 | 3.0 | 1.0 |
| Slurry D | 95.5 | 80 | 20 | | 1.24 | 0.5 | 3.0 | 1.0 |
| Slurry E | 95 | 80 | 20 | | 1.24 | 1.0 | 3.0 | 1.0 |
| Slurry F | 94.5 | 80 | 20 | | 1.24 | 1.5 | 3.0 | 1.0 |
| Slurry G | 94 | 80 | 20 | | 1.24 | 2.0 | 3.0 | 1.0 |
| Slurry H | 93.5 | 80 | 20 | | 1.24 | 2.5 | 3.0 | 1.0 |
| Slurry I | 93 | 80 | 20 | | 1.24 | 3.0 | 3.0 | 1.0 |
| Slurry J | 92.5 | 20 | 80 | | 1.24 | 3.5 | 3.0 | 1.0 |
| Slurry K | 94.5 | 20 | 80 | | 1.96 | 1.5 | 3.0 | 1.0 |
| Slurry L | 94.7 | 20 | 80 | | 1.96 | 1.3 | 3.0 | 1.0 |
| Slurry M | 94.3 | 20 | 80 | | 1.96 | 1.7 | 3.0 | 1.0 |
| Slurry N | 94.9 | 20 | 80 | | 1.96 | 1.1 | 3.0 | 1.0 |
| Slurry O | 94.2 | 20 | 80 | | 1.96 | 1.8 | 3.0 | 1.0 |
| Slurry P | 94 | 20 | 80 | | 1.96 | 2.0 | 3.0 | 1.0 |
| Slurry Q | 95.2 | 20 | 80 | | 1.96 | 0.8 | 3.0 | 1.0 |
| Slurry R | 93.5 | 20 | 80 | | 1.96 | 2.5 | 3.0 | 1.0 |

TABLE 1-continued

| | Active material | | | Active | | Conductive material | |
| | | | | | | | |
| | Wt. % | Artificial | Expansion suppressing natural | Natural | material BET $(m^2/g)$ | Binder (wt. %) SBR | (wt. %) Carbon black | Other (wt. %) CMC |
|---|---|---|---|---|---|---|---|---|
| Slurry S | 93 | 20 | 80 | | 1.96 | 3.0 | 3.0 | 1.0 |
| Slurry T | 91.1 | 80 | 20 | | 1.24 | 4.9 | 3.0 | 1.0 |
| Slurry U | 94.5 | 20 | | 80 | 12.2 | 1.5 | 3.0 | 1.0 |
| Slurry V | 94.5 | 30 | 70 | | 1.84 | 1.5 | 3.0 | 1.0 |

Example 1

The slurry K was coated onto the copper foil current collector (thickness: 10 μm) to a thickness of 50 μm and dried, and then the slurry A was coated onto the slurry K to a thickness of 50 μm and dried, and then rolled so that the total porosity becomes 20%. Thereby, a negative electrode was manufactured.

Example 2

A negative electrode was manufactured in the same manner as in Example 1, except that the slurry L was first coated and dried, and then the slurry B was coated and dried.

Example 3

A negative electrode was manufactured in the same manner as in Example 1, except that the slurry M was first coated and dried, and then the slurry B was coated and dried.

Example 4

A negative electrode was manufactured in the same manner as in Example 1, except that the slurry N was first coated and dried, and then the slurry C was coated and dried.

Example 5

A negative electrode was manufactured in the same manner as in Example 1, except that the slurry O was first coated and dried, and then the slurry C was coated and dried.

Comparative Example 1

A negative electrode was manufactured in the same manner as in Example 1, except that the slurry K was first coated and dried, and then the slurry D was coated and dried.

Comparative Example 2

A negative electrode was manufactured in the same manner as in Example 1, except that the slurry P was first coated and dried, and then the slurry E was coated and dried.

Comparative Example 3

A negative electrode was manufactured in the same manner as in Example 1, except that the slurry P was first coated and dried, and then the slurry F was coated and dried.

Comparative Example 4

A negative electrode was manufactured in the same manner as in Example 1, except that the slurry Q was first coated and dried, and then the slurry G was coated and dried.

Comparative Example 5

A negative electrode was manufactured in the same manner as in Example 1, except that the slurry Q was first coated and dried, and then the slurry H was coated and dried.

Comparative Example 6

A negative electrode was manufactured in the same manner as in Example 1, except that the slurry R was first coated and dried, and then the slurry H was coated and dried.

Comparative Example 7

A negative electrode was manufactured in the same manner as in Example 1, except that the slurry S was first coated and dried, and then the slurry I was coated and dried.

Comparative Example 8

A negative electrode was manufactured in the same manner as in Example 1, except that the slurry P was first coated and dried, and then the slurry J was coated and dried.

Example 6

Satisfaction with Condition (4); Two or More Layers of Electrode Material Layer A, Two or More Layers of Electrode Material Layer B The slurry N was coated onto the copper foil current collector (thickness: 10 μm) to a thickness of 25 μm and dried, and then the slurry N was again coated to a thickness of 25 μm and dried, and the slurry C was coated thereon to a thickness of 25 μm and dried, and the slurry C was again coated thereon to a thickness of 25 μm and dried, and then rolled so that the total porosity became 20%. Thereby, a negative electrode was manufactured.

Example 7

Unsatisfaction with Condition (4); Two or More Layers of Electrode Material Layer A, Two or More Layers of Electrode Material Layer B The slurry N was coated onto the copper foil current collector (thickness: 10 μm) to a thickness of 25 μm and dried, and then the slurry N was again coated to a thickness of 25 μm and dried, and the slurry E was coated thereon to a thickness of 25 μm and dried, and the slurry T was coated thereon to a thickness of 25 μm and dried, and then rolled so that the total porosity became 20%. Thereby, a negative electrode was manufactured.

Comparative Example 9

Unsatisfaction with Condition (2)

A negative electrode was manufactured in the same manner as in Example 1, except that the slurry U was first coated and dried, and then the slurry A was coated and dried.

Comparative Example 10

Unsatisfaction with Condition (1)

A negative electrode was manufactured in the same manner as in Example 1, except that the slurry V was first coated and dried, and then the slurry A was coated and dried.

Experimental Example 1

Adhesive Force

The negative electrode manufactured in Examples and Comparative Examples was cut into 100 mm (length)×20 mm (width) to obtain a test specimen.

A double-sided tape was attached to a slide glass, the test specimen was placed thereon and reciprocated three times with a 2 kg roller to adhere it. Then, the adhered specimen was pulled at 10 mm/sec using a UTM (TA) device to measure the peeling force from the slide glass. At this time, the measurement angle between the slide glass and the electrode was 90°.

The results are shown in Table 2 below.

Experimental Example 2

Life Capacity Maintenance Rate

For the positive electrode, $LiCoO_2$ was used as the positive electrode active material, put in NMP at ratio of 96:2:2 together with carbon black and PVDF, and mixed to prepare a positive electrode slurry. This slurry was coated onto an aluminum foil current collector to a thickness of 100 μm, dried, and then rolled so that a porosity became 25%. Thereby, a positive electrode was manufactured.

The PE separator was interposed between the negative electrode manufactured in the Examples and Comparative Examples, and the positive electrodes, and then sealed with an aluminum pouch using an electrolyte solution containing 1M $LiPF_6$ in a solvent of EC:DMC:DEC=1:2:1 to manufacture a secondary battery.

For the manufactured battery, the charging range was determined from SOC 0% to SOC 100%, and then the first cycle was charged and discharged at a current rate of 0.1 C, the second cycle at a current rate of 0.2 C, and the third to 100th cycle each at 0.5 C, and then the capacity maintenance rate of the battery was calculated as follows, and the results are shown in Table 2 below.

16

Capacity maintenance rate (%) =

(Discharge capacity after 100th cycle/Initial discharge capacity)×100

Experimental Example 3

High-Temperature Resistance Increase Rate

For the negative electrodes of Examples 1 to 7 and Comparative Examples 1 to 10, the high-temperature storage resistance increase rate was evaluated by the following method, respectively.

The battery manufactured in Experimental Example 2 was charged with 100% SOC, taken a break for 30 minutes and then discharged to 2 C. At this time, the resistance of the battery was set as the initial resistance. After that, the battery was charged again at 0.5 C with 100% SOC, and then stored in an oven at 60° C. After 4 weeks, the battery was removed from the oven, taken a break for 4 hours to allow it to cool to room temperature, and then discharged to 2 C. At this time, the resistance of the battery was measured, and then the resistance increase rate of the battery was calculated through the following equation, and the results are shown in Table 2 below.

Resistance increase rate (%) = [(Resistance after 4 weeks−Initial resistance)/Initial resistance] ×

100

Experimental Example 4

Rapid Charging Efficiency

For the fabricated battery prepared in Experimental Example 2, the charging range was determined from 0% SOC to 100% SOC, and then the first cycle was charged and discharged at a current rate of 0.1 C, the second cycle at a current rate of 0.2 C, and the third cycle at a current rate of 2.5 C, and then the rapid charging efficiency of the battery was calculated as follows, and the results are shown in Table 2 below.

Rapid charging efficiency (%)=[2.5 C current discharge capacity/0.2 C current discharge capacity]×100

TABLE 2

| | Adhesive force (gf/20 mm) | Life capacity maintenance rate (%) | High-temperature resistance increase rate (%) | Rapid charging efficiency (%) |
|---|---|---|---|---|
| Example 1 | 48.8 | 98.2 | 8.8 | 65.2 |
| Example 2 | 45.2 | 98.1 | 11.3 | 66.3 |
| Example 3 | 44.8 | 97.9 | 9.6 | 64.8 |
| Example 4 | 36.1 | 97.2 | 14.3 | 61.6 |
| Example 5 | 58.3 | 98.4 | 8.9 | 60.2 |

TABLE 2-continued

| | Adhesive force (gf/20 mm) | Life capacity maintenance rate (%) | High-temperature resistance increase rate (%) | Rapid charging efficiency (%) |
|---|---|---|---|---|
| Example 6 | 37.8 | 97.5 | 12.7 | 62.3 |
| Example 7 | 36.8 | 97.2 | 14.1 | 60.4 |
| Comparative Example 1 | 9.7 | 78.2 | 35.1 | 32.8 |
| Comparative Example 2 | 18.5 | 84.3 | 25.4 | 36.8 |
| Comparative Example 3 | 21.7 | 86.9 | 21.5 | 38.1 |
| Comparative Example 4 | 11.8 | 77.6 | 28.7 | 42.6 |
| Comparative Example 5 | 13.1 | 79.0 | 26.0 | 44.1 |
| Comparative Example 6 | 68.9 | 95.7 | 12.5 | 35.6 |
| Comparative Example 7 | 82.3 | 95.5 | 11.4 | 31.9 |
| Comparative Example 8 | 56.0 | 97.2 | 14.2 | 28.6 |
| Comparative Example 9 | 31.6 | 92.3 | 36.2 | 48.2 |
| Comparative Example 10 | 28.3 | 94.6 | 25.1 | 51.8 |

Referring to Table 2, it was confirmed that Comparative Example 10 not satisfying the condition (1) and Comparative Example 9 not satisfying the condition (2) were deteriorated in all aspects as compared with the Examples of the present disclosure. Considering Comparative Examples 1 to 8 not satisfying the condition (3), it was confirmed that the lithium secondary batteries manufactured using the negative electrodes of Examples satisfying all of the conditions (1) to (3) of the present disclosure were excellent in all of the adhesive force, life capacity maintenance rate, high temperature resistance increase rate, and rapid charging efficiency as compared with Comparative Examples having a similar binder content (for example, Example 2 and Comparative Example 3). It was confirmed that when the content of the binder was too small (Comparative Examples 1 and 4), it was very deteriorated in all respects, and when the content was too high (Comparative Examples 7 to 8), the adhesive force was good, which was advantageous for life maintenance rate and high-temperature resistance rate, but the rapid charging ability was very poor. When the binder content of the upper layer was too small (Comparative Examples 2 and 3), it was not desirable in all aspects of performance, and when the binder content of the lower layer was too small (Comparative Examples 4 and 5), the adhesive force is very low, and it was deteriorated in all aspects, and when the binder content of the lower layer was too high (Comparative Example 6), the adhesive strength was good, but the life maintenance rate or high-temperature resistance rate was not excellent, and the rapid charging ability was greatly reduced.

On the other hand, considering Example 6 satisfying the condition (4), and Example 7 not satisfying the condition (4), it was confirmed that when using the negative electrode of Example 6 satisfying the condition (4), the overall performance was improved. This proves that the binder exerts a more excellent effect when it spreads evenly over the whole rather than intensively distributed only in the upper layer.

Those of ordinary skill in the field to which the present disclosure belongs will be able to perform various applications and modifications within the scope of the present disclosure based on the above disclosure.

What is claimed is:

1. An electrode for a lithium secondary battery comprising:

a current collector; and an electrode material layer containing an active material and a binder formed on at least one surface of the current collector, wherein, when the electrode material layer is divided in half based on a thickness, an upper layer located away from the current collector having a half thickness of the electrode material layer is referred to as an electrode material layer A, and a lower layer located close to the current collector having a half thickness of the electrode material layer is referred to as an electrode material layer B, each of the electrode material layer A and the electrode material layer B contains one or more active material layers, and satisfies all of the following conditions (1) to (3):

(1) the electrode material layer A contains artificial graphite as the active material in an amount of 75% by weight or more based on a total weight of the active material contained in the electrode material layer A, and the electrode material layer B contains an expansion-suppressing natural graphite as the active material in an amount of 80% by weight or more based on a total weight of the active material contained in the electrode material layer B, (2) the artificial graphite in the electrode material layer A has a specific surface area (BET) of 0.6 to 1.4 $m^2/g$, and the expansion-suppressing natural graphite in the electrode material layer B has a specific surface area (BET) of 1.4 to 3.6 $m^2/g$, (3) when a weight % occupied by the binder contained in the electrode material layer A based on the total weight of the electrode material layer is referred to as a, and a weight % occupied by the binder contained in the electrode material layer B based on the total weight of the electrode material layer is referred to as b, a>b, $3 \leq a+b \leq 5$, $2 \leq a \leq 3$, and $1 \leq b \leq 2$, and (4) when a concentration of the binder contained in an entire electrode material layer is 1, the electrode material layer A is divided in half based on the thickness, a concentration of the binder contained in an area A' located close to a surface of the electrode is referred to as a', and a concentration of the binder contained in a region A" located inside the electrode is referred to as a", and when the electrode material layer B is divided in half based on the thickness, and a concentration of the binder contained in a region B' located close to the electrode material layer A is referred to as b', and a concentration of the binder contained in the area B" located near the current collector is referred to as b", and a value of a'/(a"+b'+b") is 1/3 to 1.5.

2. The electrode for a lithium secondary battery according to claim 1, wherein the electrode material layer A and the electrode material layer B have a multi-layered structure that forms a boundary with each other.

3. The electrode for a lithium secondary battery according to claim 1, wherein each of the electrode material layer A and the electrode material layer B comprises two or more active material layers, and have a multi-layered structure that forms a boundary with each other.

4. The electrode for a lithium secondary battery according to claim 1, wherein the electrode material layer A comprises artificial graphite as the active material in an amount of 80% by weight or more based on the total weight of the active material contained in the electrode material layer A.

5. The electrode for a lithium secondary battery according to claim 1, wherein the expansion-suppressing natural graphite contained in the electrode material layer B is a special natural graphite having a specific surface area (BET) of 1.4 to 3.6 $m^2/g$.

6. The electrode for a lithium secondary battery according to claim 1, wherein the expansion-suppressing natural graphite contained in the electrode material layer B has an average particle size (D50) of 5 to 30 μm.

7. The electrode for a lithium secondary battery according to claim 1, wherein the binder contained in the electrode material layer A and the electrode material layer B comprises styrene-butadiene rubber (SBR).

8. The electrode for a lithium secondary battery according to claim 1, wherein each of the electrode material layer A and the electrode material layer B further comprises carboxymethylcellulose (CMC).

9. The electrode for a lithium secondary battery according to claim 8, wherein the CMC is contained in an amount of 0.1 to 5% by weight based on the total weight of each of the electrode material layers.

10. The electrode for a lithium secondary battery according to claim 1, wherein each of the electrode material layer A and the electrode material layer B further comprises a conductive material.

11. The electrode for a lithium secondary battery according to claim 10, wherein the conductive material is contained in an amount of 0.1 to 5% by weight based on the total weight of each of the electrode material layers.

12. The electrode for a lithium secondary battery according to claim 1, wherein the current collector comprises Cu.

13. The electrode for a lithium secondary battery according to claim 1, wherein the electrode for the lithium secondary battery is a negative electrode.

14. A lithium secondary battery comprising the electrode for lithium secondary battery according to claim 1.

15. The electrode for a lithium secondary battery according to claim 1, wherein the binder included in the electrode material layer A and the binder included in the electrode material layer B are the same.

16. The electrode for a lithium secondary battery according to claim 1, wherein the binder included in the electrode material layer A and the binder included in the electrode material layer B are different.

17. The electrode for a lithium secondary battery according to claim 1, wherein the expansion-suppressing natural graphite is a scale-like natural graphite in which internal pores are spheroidized using a pitch binder.

18. The electrode for a lithium secondary battery according to claim 1, wherein the expansion-suppressing natural graphite is a natural graphite in which internal pores are blocked by a pitch binder.

* * * * *